(No Model.) 2 Sheets—Sheet 1.
J. W. MAXWELL.
BAND SAW MILL.
No. 357,679. Patented Feb. 15, 1887.
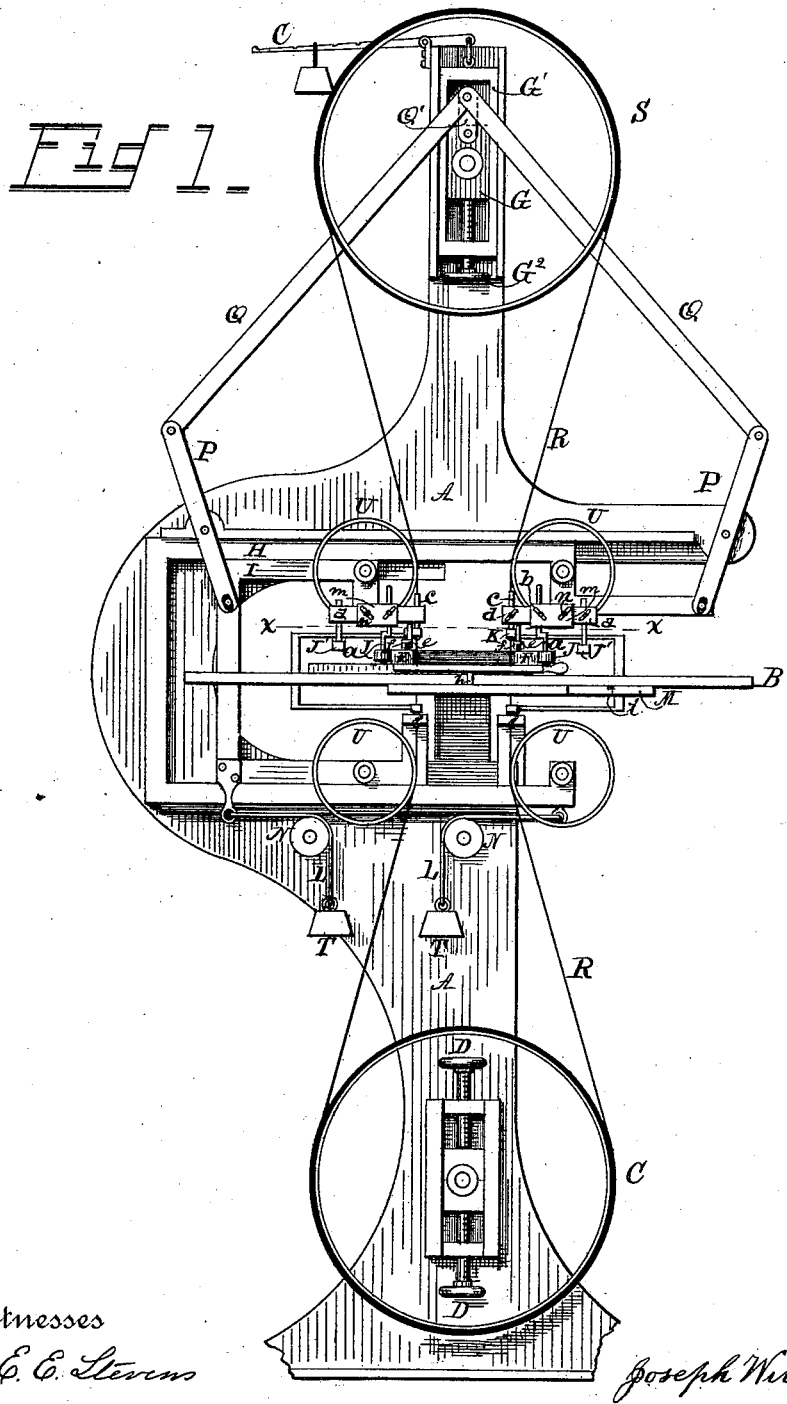
Witnesses
L. E. E. Stevens
P. E. Stevens
Inventor
Joseph Wiley Maxwell
By his Attorney W. X. Stevens (No Model.) 2 Sheets—Sheet 2.
J. W. MAXWELL.
BAND SAW MILL.
No. 357,679. Patented Feb. 15, 1887.
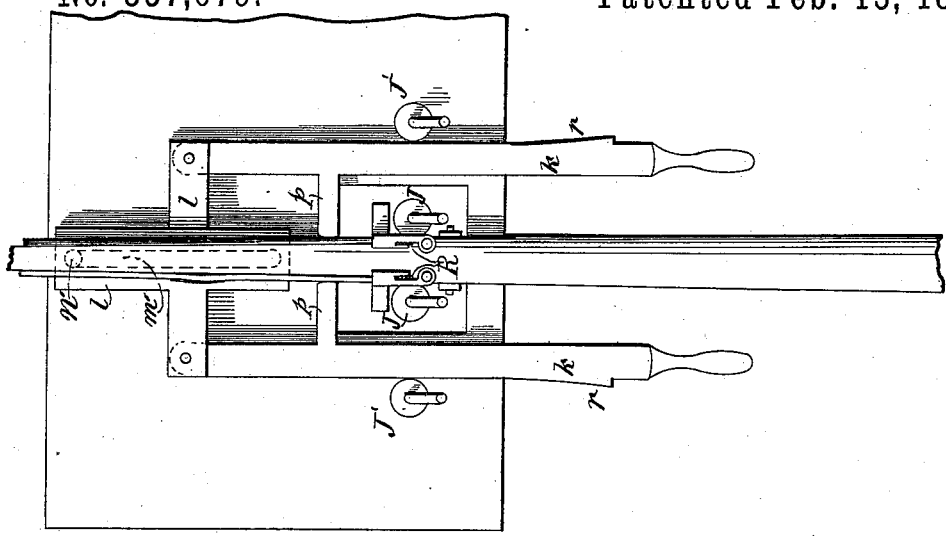
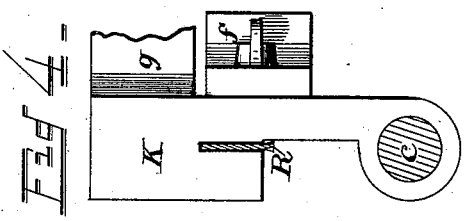
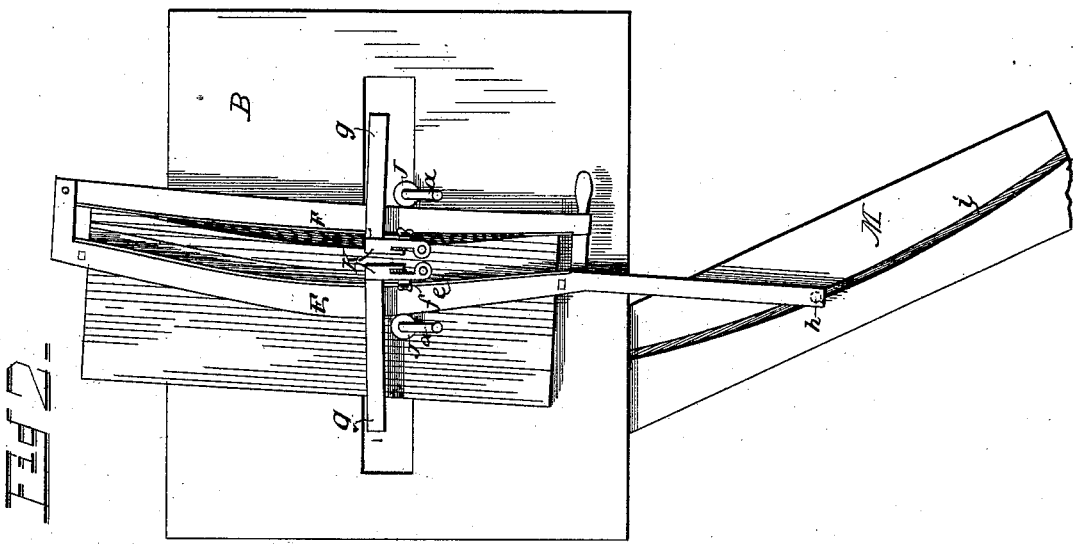
Witnesses
S. E. E. Stevens
P. C. Stevens
Inventor
Joseph Wiley Maxwell.
By his Attorney W. X. Stevens

UNITED STATES PATENT OFFICE.

JOSEPH WILEY MAXWELL, OF LOUISVILLE, KENTUCKY.

BAND-SAW MILL.

SPECIFICATION forming part of Letters Patent No. 357,679, dated February 15, 1887.

Application filed May 29, 1886. Serial No. 203,669. (No model.)

*To all whom it may concern:*

Be it known that I, JOSEPH WILEY MAXWELL, a citizen of the United States, residing at Louisville, in the county of Jefferson and State of Kentucky, have invented certain new and useful Improvements in Band-Saw Mills; and I do hereby declare the following to be a full, clear, and exact description of the invention, such as will enable others skilled in the art to which it appertains to make and use the same.

This invention relates to that class of band-saw mills which are adapted to make two cuts at once, and it more particularly relates to improvements in my Patent No. 339,797; and its object is to provide, first, means whereby two band-saw blades or the upward-traveling side and the downward-traveling side of a single-band saw will be automatically guided to follow curvatures and knots in the two sides of a hoop-pole, so as to saw therefrom two hoops at once of even thickness throughout their length; secondly, to provide means whereby the saws may be guided independently of each other to follow the curvatures of the two edges at once of form-patterns passed through the machine, for the purpose of sawing a great number of pieces alike in size and form—such as wheel-fellies, chair-legs, chair-bottoms in segments, plow-beams, parts of wagons, &c.—whereby the piece will be completely shaped at one operation, excepting rounding the ends, in which work but one saw can be used; thirdly, to provide means whereby equal tension may be maintained upon the saw at all times, whether its two blades be drawn together or separated; and, fourthly, in means whereby the operator may be enabled to assist the machine in guiding hoop-poles of irregular form and of forming the laps of the hoops by gradually thinning their ends.

To this end my invention consists in the construction and combination of parts forming a band-saw mill, hereinafter described and claimed, reference being had to the accompanying drawings, in which—

Figure 1 is a front elevation of a band-saw mill, showing the general location of the main features of my invention, necessarily on a small scale. Fig. 2 is a plan view of the same on a larger scale, taken at the section-line $x\ x$, with the form-pattern in position for service. Fig. 3 is a plan view taken at the same line $x\ x$, with the hoop-pole guide in position for service. Fig. 4 is a plan view of a single caster saw-guide.

A represents the frame of the mill, and B the saw-table.

C is the lower saw-carrying wheel, journaled in a bearing housed in the frame A and provided with an adjusting-screw, D, to fit its position to the length of the saw-band R.

S is the upper saw-carrying-wheel, journaled in a bearing, G, which is fitted to slide vertically in a housing, G', which is also fitted to slide vertically in the frame A.

H and I represent sashes, fitted to slide transversely to the machine, each sash being provided with two pulleys, U, to bear against the outer faces of the saw-blade R. As this saw is adapted to cut with both its upward and downward traveling portions, these two portions of one and the same saw are practically two blades, and will be so referred to for the purposes of this specification.

T T are weights, attached to the sashes H and I by means of straps L, passing over pulleys N, which are journaled to the frame A, whereby constant force is exerted through the pulleys U upon the saw-blades to press them together.

O is a lever, provided with a weight acting upon the bearing-housing G' of wheel S to raise it and to distend the saw in opposition to the action of the weights T. These two forces are intended to overcome the friction of the sliding sashes and the bearing-housing and to counterbalance each other, so that the saw-blades may be readily moved sidewise out of their normal planes by other forces.

P P are levers, pivoted to the frame A and connected at one end of each, respectively, with the sashes H and I, and connected at the other end of each with the bearing G by means of rods Q and a pitman, Q'. By this means an equal tension on the saw-band is mechanically maintained at all times. If the blades are parted, that motion is transmitted through the levers P and rods Q to raise the wheel S, thereby taking up the slack in the saw-band, which would otherwise have rendered it too loose for service, and vice versa. The necessity for this will appear further on.

The form-pattern E F, the pattern-guide M, and the saw-twisting guides K, being fully described and separately claimed in another application of even date herewith for a patent, they will be herein referred to only in their relationship to other coacting parts of the present saw-mill. The form-pattern E F is to be shaped at its edges to conform to the piece of work to be made thereby. The pattern here shown is for a wagon axle-tree.

J represents rollers, journaled on the sashes H and I to travel against the edges of the form-pattern, whereby the profile of the form-pattern will be transmitted through the pulleys U and saw-blades R to the lumber, as required. To do this the saws necessarily traverse to and from each other, or spread and close, sometimes tightening the blade-band and sometimes loosening it; but the levers P and rods Q transmit corresponding opposite motions to the bearing G, whereby compensation is made and the tension on the saw-band remains equal. The pitman Q', by swinging on its pivot, will adapt itself to varying movements of the rods Q when one side of the pattern diverges more or less than the other.

$G^2$ is a hand screw-threaded in the housing G', to raise and adjust the bearing G independently of the sliding movement of the housing.

Each roller J is journaled on a crank-shaped shaft $a$, which passes vertically through a block, $m$, which is fitted to slide on arms $d$ of the respective sashes H and I, and is secured in the block by a set-screw, $b$, while the block is secured on the arm $d$ by a set-screw, $n$. By this means each roller J may be raised or lowered and set to fit different patterns, and each roller, by the crank form of its shaft, may be swung to or from the pattern and fixed by the set-screw, so that the saws cutting parallel with the profile of the pattern may be set to cut a narrow or wide axle-tree by the same pattern.

M represents the pattern-guide, which consists of a board or plate secured to the under side of the machine-table B, to project in front thereof, and having in it a groove, $i$, corresponding with the path taken by the rear end of the form-pattern E F when the pattern is so guided through the machine as to equalize the angles of divergence of the two saw-blades from their normal planes in following the contour of the pattern.

$h$ is a follower, in the present case consisting of a pin projecting downward from the rear end of the form-pattern to engage the groove $i$, whereby the rear end of the pattern will be automatically guided, as described.

K K represent the saw-guides, each grooved to receive the saw-blade, and hung to arms $d$ of the respective sashes H I by pivots $c$ directly in front of each blade. By this means the blades are twisted, as a caster-wheel follows its pivot, to follow the lead of the sashes, which are moved transversely to the machine by the pattern. Supposing one of the sashes was moved gradually to the right by the pattern, then the pivot $c$, being carried to the right, would turn the saw-edge in that direction, thus reproducing the inclination or curve of the pattern. This is perfectly effective where the angle of divergence is only moderate. To force the blades to follow the pattern, whether the blades are sharp or dull, with teeth well set or badly set, the guides K communicate with the form-pattern to be actuated to follow the profile thereof by any usual means for such purposes—such, for instance, as a flange, $e$, on the pattern conforming to the pattern-profile and a slotted follower, $f$, to engage the said flange.

Wherever one portion is described herein as conforming with another portion it is not meant that the two portions are necessarily of exactly the same form and size, but that they conform in that respect which will produce the result described. It is a well-known fact among machine-pattern makers that the pattern will seldom cause the machine to reproduce its counterpart. Certain angles are increased, while others are diminished, requiring patterns of carefully adapted forms to produce given results; but the adaptation of patterns for this machine requires only the usual knowledge of such work.

The shafts $a$ are made crank-shaped, in order that the rollers J may be carried beneath the pulleys U to travel on the edges of the pattern in the vertical plane of the saw, while the body of the said shaft $a$ passes up beside the pulley to permit vertical adjustment. The two guides K acting upon saw-blade are termed "a pair of guides," and the two guides of each pair are connected as one by yokes $g$, whereby the working portion of each saw-blade is maintained in a plane, the twists in the saw taking place above and below each pair of guides.

Experience has shown that the crooks and knots in hoop-poles require constant attention from the sawyer to assist in guiding the poles so as to saw perfect hoops from all poles. To enable my machine to do the best work on all poles as they come, I have adapted a handling clamp or tongs consisting of the two levers $k$, pivoted to the head $l$, and provided midway with inwardly-projecting fingers $p$. The head is slotted at $m'$ to be placed upon a pin, $n'$, which is removably fixed in the farther side of the saw-table.

$r\ r$ represent wedges on the sides of the tongs. The hoop-pole is pushed to the saws by hand as long as it may be readily handled from the front, and then the tongs are used to draw it through by grasping it with the fingers $p$. By canting the tongs to one side or the other, the pole may be quickly thrown out of line to make the saws follow a short crook, and the tapering lap ends may be shaped by allowing the wedge portions $r$ to pass between the rollers J', which are hung to the bar $d$ in a manner similar to the rollers J, thus acting thereon like a form-pattern. When either of these rollers encounters a knot, it moves the sash outward in passing over the knot, and the saw, trailing as a caster, follows the curve of the knot, thus making the hoop no thicker there than elsewhere. There are many poles from which an odd number of hoops may be sawed. Then but one saw can be in service on the last hoop. By the aid of these tongs the sawyer may so guide the pole as to counteract the one-sided strain of the weights and keep the pole against one roller, so as to saw a good single hoop. He may also bring one finger to bear on the hoop-pole ahead of the other to throw the pole somewhat diagonally across the table, whereby a wedge-shaped lap may be sawed on a single hoop. Hoop-poles, being sometimes crooked, will not lie well on a flat table while being sawed. I therefore provide a transverse roller in front and rear of the saw for the hoop to travel on, either above the level of the table or in place of the removed table; but as no claim is here made to such rollers, and as such are shown in my former patent, I do not here illustrate them.

What I claim as my invention, and desire to secure by Letters Patent, is—

1. In a band-saw mill, the combination of a saw-band pulley journaled in a bearing fitted to slide vertically, rollers journaled in sashes fitted to slide transversely to the saw-blades and adapted to engage the outer faces of the said blades, and levers and rods connecting the said sashes with the said sliding bearing, substantially as shown and described.

2. The combination, in a band-saw mill, of a band-saw, two pulleys therefor, one of the said pulleys being mounted to advance toward and recede from the other, rollers mounted to bear upon the outer sides of the saw and to reciprocate laterally, and connections, substantially as described, between the said rollers and the said advancing and receding pulley, whereby the two blades of the saw may traverse to and from each other and the saw-band be maintained at even tension, as set forth.

3. The combination of a band-saw-machine frame, guides for the saw adapted to move transversely in the frame, a bearing for one of the saw-wheels adapted to move vertically in the frame, and connections between the saw-guides and the said saw-wheel bearing, substantially as shown and described, whereby lateral motion of said guides produces vertical motion to the said wheel-bearing, to maintain even tension of the saw while the vertical portions of its blade approach each other and recede, as described.

4. The combination of the vertically-sliding bearing G, the wheel S, journaled therein, the band-saw R, mounted on the said wheel and the wheel C, the sashes H and I, fitted to slide transversely to the saws, the rollers U, journaled on the said sashes to bear against the saw-blades, the weights T, connected with the sashes, the levers P, pivoted to the frame of the mill and connected with the sashes, and the bearing G, substantially as shown and described.

5. The combination of the frame A, the sashes H I, fitted to slide therein and provided with arms $d'$, the saw-guiding rollers U, journaled in the said sashes, the blocks $m$, fitted to slide upon the arms $d$ and provided with set-screws $n$, the crank-shaped shaft $a$, fitted in the block $m$ and provided with set-screws $b$, and the rollers J, journaled on the cranks of the shafts $a$, substantially as shown and described.

6. The combination of the saw R, the sashes H I, fitted for lateral motion and provided with arms $d$, the rollers U, journaled on the said sashes to bear against the sides of the saw, guides K for the saw attached to the said sashes, the blocks $m$, fitted to slide on the arms $d$ and provided with set-screws $n$, and the crank-shaped shaft $a$, adjustably fitted in the block $m$ and provided with a pattern-following roller, J, substantially as shown and described, whereby the pattern-follower may be properly adjusted relatively to the saw guided by the rollers U.

7. The combination of a band-saw, its table, lateral guides for the saw provided with rollers J, the pin $n'$, projecting above the table, the cross-head $l$, having the slot $m'$, and the levers K, pivoted in the said head and having the fingers $p$ and the wedges $r$, adapted to engage the rollers J, substantially as shown and described.

8. The combination of the independently-sliding sashes H and I, the vertically-sliding bearing G, the wheel S, journaled thereon, the saw R, mounted on wheel S, the pitman $Q'$, pivoted to the bearing G, the levers P, pivoted to the main frame and connected with the sashes H I and the pitman $Q'$, substantially as shown and described.

9. The combination of the saw-frame A, a housing, $G'$, fitted to slide vertically therein, a wheel-bearing, G, fitted to slide vertically in the said housing, and a hand-screw, $G^2$, threaded in the housing to raise the bearing, substantially as shown and described.

10. The combination, in a band-saw mill, of two blades, means for traversing them laterally, a pin projecting above the saw-table, and a pair of tongs consisting of a cross-head having a longitudinal slot to engage the said pin, and two levers pivoted in the heads, each provided with an inwardly-projecting finger, substantially as shown and described.

In testimony whereof I affix my signature in presence of two witnesses.

JOSEPH WILEY MAXWELL.

Witnesses:
CHRISTIAN KORB,
J. G. NAPIER.